(12) United States Patent
Higuchi et al.

(10) Patent No.: US 12,139,434 B2
(45) Date of Patent: Nov. 12, 2024

(54) COVER GLASS

(71) Applicant: Nippon Sheet Glass Company, Limited, Tokyo (JP)

(72) Inventors: Toru Higuchi, Tokyo (JP); Takeshi Yabuta, Tokyo (JP); Satoshi Tanaka, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 899 days.

(21) Appl. No.: 17/256,531

(22) PCT Filed: Jun. 26, 2019

(86) PCT No.: PCT/JP2019/025417
§ 371 (c)(1),
(2) Date: Aug. 2, 2021

(87) PCT Pub. No.: WO2020/004481
PCT Pub. Date: Jan. 2, 2020

(65) Prior Publication Data
US 2021/0371328 A1    Dec. 2, 2021

(30) Foreign Application Priority Data
Jun. 29, 2018    (JP) .................. 2018-125617

(51) Int. Cl.
*B32B 3/30*    (2006.01)
*B32B 7/023*    (2019.01)
(Continued)

(52) U.S. Cl.
CPC .............. *C03C 17/002* (2013.01); *B32B 3/30* (2013.01); *B32B 7/023* (2019.01);
(Continued)

(58) Field of Classification Search
CPC .............. B32B 17/06; B32B 17/10036; B32B 17/10761; B32B 2457/20; B32B 2605/08
See application file for complete search history.

(56) References Cited

U.S. PATENT DOCUMENTS

2014/0210605 A1    7/2014    Abel et al.
2016/0068423 A1    3/2016    Tanaka et al.
(Continued)

FOREIGN PATENT DOCUMENTS

EP    3 798 694 A1    3/2021
FR    3 059 938 A1    6/2018
(Continued)

OTHER PUBLICATIONS

Japanese Office Action for Japanese Application No. 2018-125617, dated Jun. 7, 2022, with English translation.
(Continued)

*Primary Examiner* — Elizabeth E Mulvaney
(74) *Attorney, Agent, or Firm* — Birch, Stewart, Kolasch & Birch, LLP

(57) ABSTRACT

The present invention provides a cover glass that can be installed in an automobile so as to cover a display unit including a plurality of information areas, including a glass body that has a first surface facing the display unit side, and a second surface opposite to the first surface, and that includes a plurality of transmission areas respectively corresponding to the information areas.

17 Claims, 2 Drawing Sheets

(51) Int. Cl.
*B32B 17/10* (2006.01)
*C03C 3/087* (2006.01)
*C03C 4/02* (2006.01)
*C03C 4/08* (2006.01)
*C03C 17/00* (2006.01)
*C03C 17/32* (2006.01)
*C03C 21/00* (2006.01)
*C03C 23/00* (2006.01)

(52) U.S. Cl.
CPC .. *B32B 17/10036* (2013.01); *B32B 17/10137* (2013.01); *B32B 17/10807* (2013.01); *C03C 3/087* (2013.01); *C03C 4/02* (2013.01); *C03C 4/08* (2013.01); *C03C 17/009* (2013.01); *C03C 17/32* (2013.01); *C03C 21/002* (2013.01); *C03C 23/0085* (2013.01); *B32B 2250/02* (2013.01); *B32B 2255/20* (2013.01); *B32B 2307/40* (2013.01); *B32B 2307/748* (2013.01); *B32B 2457/20* (2013.01); *C03C 2217/45* (2013.01); *C03C 2217/485* (2013.01)

(56) References Cited

U.S. PATENT DOCUMENTS

| | | |
|---|---|---|
| 2016/0214885 A1 | 7/2016 | Senshu et al. |
| 2016/0318794 A1 | 11/2016 | Tanaka et al. |
| 2017/0101340 A1* | 4/2017 | Inoue ................. C09J 7/22 |
| 2017/0129806 A1 | 5/2017 | Fuji et al. |
| 2017/0136734 A1 | 5/2017 | Kobune et al. |
| 2020/0096854 A1 | 3/2020 | Schiavoni et al. |
| 2020/0262744 A1 | 8/2020 | Fenton et al. |
| 2020/0299184 A1 | 9/2020 | Fenton et al. |
| 2021/0080778 A1 | 3/2021 | Hatano et al. |

FOREIGN PATENT DOCUMENTS

| | | |
|---|---|---|
| JP | 64-17572 U | 1/1989 |
| JP | 2000-343981 A | 12/2000 |
| JP | 2015-99285 A | 5/2015 |
| JP | 2015-178960 A | 10/2015 |
| JP | 2016-109936 A | 6/2016 |
| JP | 2016-523788 A | 8/2016 |
| JP | 2017-90750 A | 5/2017 |
| WO | WO 2014/148020 A1 | 9/2014 |
| WO | WO 2014/167854 A1 | 10/2014 |
| WO | WO 2015/093029 A1 | 6/2015 |
| WO | WO 2016/010009 A1 | 1/2016 |
| WO | WO 2019/055581 A1 | 3/2019 |

OTHER PUBLICATIONS

Extended European Search Report for European Application No. 19825783.4, dated Mar. 18, 2022.

International Search Report (PCT/ISA/210) issued in PCT/JP2019/025417, dated Oct. 1, 2019.

Written Opinion of the International Searching Authority (PCT/ISA/237) issued in PCT/JP2019/025417, dated Oct. 1, 2019.

* cited by examiner

COVER GLASS

TECHNICAL FIELD

The present invention relates to a cover glass that is installed in an automobile so as to cover a display unit including a plurality of information areas.

BACKGROUND ART

Conventionally, covers made of resin have been used as covers for covering various devices and display areas of automobiles, such as a dashboard. However, in recent years, covers made of glass, i.e., cover glasses, have been developed to replace covers made of resin, in view of appearance and rigidity (e.g., Patent Literature 1).

CITATION LIST

Patent Literature

Patent Literature 1: JP 2016-109936A

SUMMARY OF INVENTION

Technical Problem

Meanwhile, many display areas such as a navigation system, in addition to measuring instruments such as a speedometer, are provided inside the recent automobiles, and therefore there is a demand for a cover glass that can accommodate these display areas. The present invention has been made in order to solve the above-described problem, and it is an object of the invention to provide a cover glass that can accommodate a plurality of display areas inside an automobile.

Solution to Problem

Aspect 1. A cover glass that can be installed in an automobile so as to cover a display unit including a plurality of information areas, including
 a glass body that has a first surface facing the display unit side, and a second surface opposite to the first surface, and that includes a plurality of transmission areas respectively corresponding to the information areas.

Aspect 2. The cover glass according to aspect 1,
 wherein the cover glass has a maximum length in a horizontal direction that is greater than or equal to three times a maximum length thereof in a vertical direction.

Aspect 3. The cover glass according to aspect 2,
 wherein the glass body has a length in the horizontal direction of 500 mm or more.

Aspect 4. The cover glass according to anyone of aspects 1 to 3,
 wherein the plurality of transmission areas extend in the horizontal direction, and include a first transmission area located close to a driver's seat side, and a second transmission area located distant from the driver's seat.

Aspect 5. The cover glass according to aspect 4, further including
 a shielding layer that is stacked between the first transmission area and the second transmission area of the glass body, and that does not transmit light therethrough.

Aspect 6. The cover glass according to aspect 5,
 wherein the shielding layer is stacked in an area of the glass body that is other than the first and second transmission areas.

Aspect 7. The cover glass according to any one of aspects 1 to 6,
 wherein projections and depressions are formed on at least one of the first surface and the second surface, and the projections and depressions have a depth of 20 to 200 nm.

Aspect 8. The cover glass according to aspect 7,
 wherein, when the surface on which the projections and depressions are formed is subjected to a scratch test according to JIS R 3255 "Test methods for adhesion of thin films on glass substrate", the cover glass has an adhesive strength of 100 mN or more.

Aspect 9. The cover glass according to aspect 7 or 8,
 wherein the depth of the projections and depressions formed on the first surface and the depth of the projections and depressions formed on the second surface are different from each other.

Aspect 10. The cover glass according to any one of aspects 7 to 9,
 wherein the glass body has an average value of transmittance gains for 400 to 800 nm wavelength light, of 1.0 or more.

Aspect 11. The cover glass according to any one of aspects 7 to 10,
 wherein, in the first surface and the second surface, voids are formed on the surface on which the projections and depressions are formed, and/or inside the projections and depressions.

Aspect 12. The cover glass according to aspect 4 or 5,
 wherein projections and depressions are formed in a surface of each of the first transmission area and the second transmission area, and
 a depth of the projections and depressions of the second transmission area is larger than a depth of the projections and depressions of the first transmission area.

Aspect 13. The cover glass according to aspect 4 or 5,
 wherein projections and depressions are formed in a surface of each of the first transmission area and the second transmission area, and
 a depth of the projections and depressions in the vicinity of a peripheral edge of each of the first transmission area and the second transmission area is different from a depth of the projections and depressions in the vicinity of a center of each of the first transmission area and the second transmission area.

Aspect 14. The cover glass according to aspect 4,
 wherein, in the glass body, an area in which the first transmission area is formed, and an area thereof in which the second transmission area is formed are different from each other in positions in a front-rear direction of the automobile.

Aspect 15. The cover glass according to aspect 4,
 wherein the glass body includes a first area in which the first transmission area is formed, a second area in which the second transmission area is formed, and an intermediate area between the first area and the second area, and
 a radius of curvature of the intermediate area is smaller than a radius of curvature of each of the first and second areas.

Aspect 16. The cover glass according to aspect 4, wherein the glass body is formed flat.

Aspect 17. The cover glass according to aspects 1 to 15, wherein the glass body contains, in mol %:
66 to 72% $SiO_2$;
2 to 4% $Al_2O_3$;
8 to 15% MgO;
1 to 8% CaO;
12 to 16% $Na_2O$; and
0 to 1% $K_2O$,
a total content of MgO and CaO (MgO+CaO) is in a range of 12 to 17%, and
a molar ratio of CaO to the total content of MgO and CaO (CaO/(MgO+CaO)) is in a range of 0.1 to 0.4.

Aspect 18. The cover glass according to any one of aspects 1 to 17, wherein the glass body has been subjected to chemical strengthening.

Aspect 19. The cover glass according to any one of aspects 1 to 18,
wherein the glass body includes:
a first glass sheet;
a second glass sheet; and
an intermediate film disposed between the first and second glass sheets.

Advantageous Effects of Invention

The cover glass according to the present invention can accommodate a plurality of display areas inside an automobile.

DESCRIPTION OF EMBODIMENTS

Hereinafter, an embodiment for a case where a cover glass according to the present invention is applied to a dashboard of an automobile will be described with reference to the drawings.

<1. Outline of Cover Glass>

Figure 1:
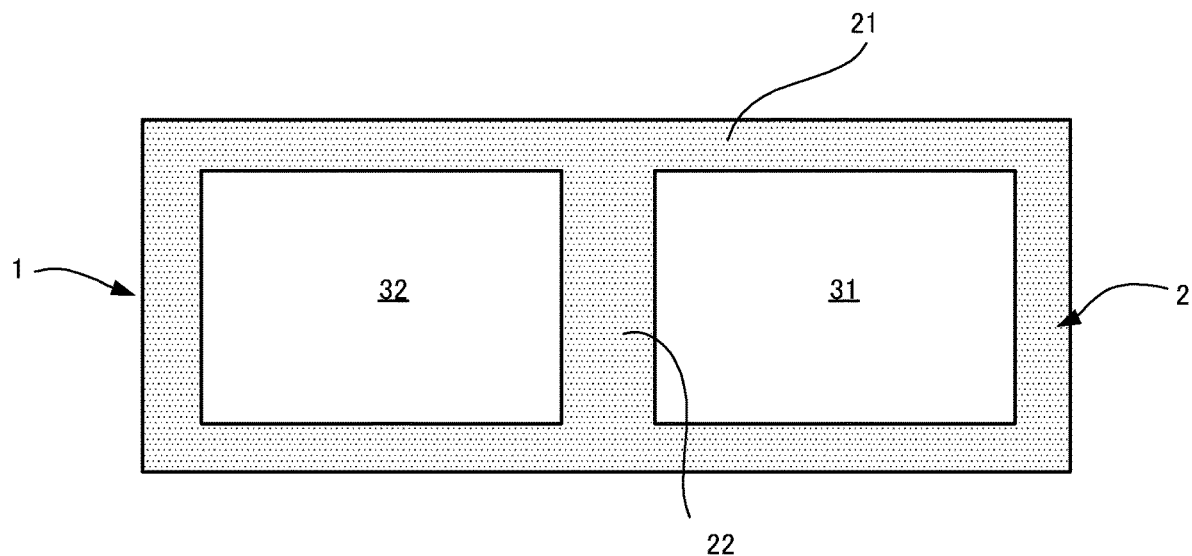
FIG. 1 is a plan view showing an embodiment of a cover glass according to the present invention.
Figure 2:
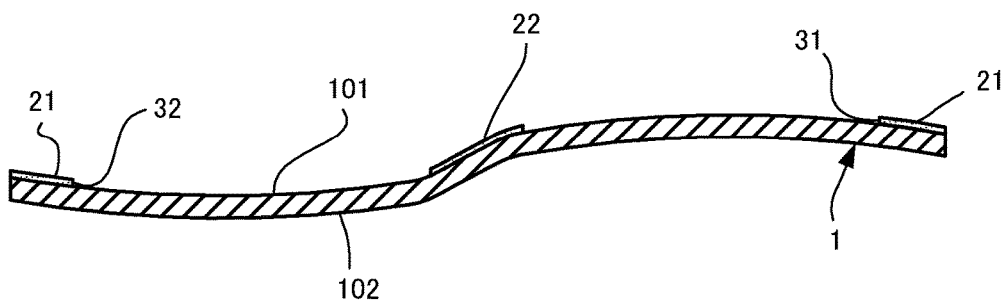
FIG. 2 is a cross-sectional view taken along the line A-A in FIG. 1.

FIG. 1 is a plan view of a cover glass according to the present embodiment, and FIG. 2 is a cross-sectional view taken along the line A-A in FIG. 1. As shown in FIG. 1, the cover glass can be mounted to a dashboard of an automobile, and includes a rectangular glass sheet (glass body) 1 extending in the horizontal direction, and a shielding layer 2 that is stacked on a surface of the glass sheet 1 on the vehicle interior side and that does not transmit light therethrough. The automobile dashboard to which the cover glass of the present embodiment can be mounted is provided with a display unit including a first information area in which a measuring instrument such as a speedometer is disposed, and a second information area that is disposed on the left side of the first information area and in which various types of information such as a car navigation system and settings of the automobile are disposed. That is, the first information area is an area disposed in front of the driver, and the second information area is an area disposed on the center console side. Also, the cover glass covers the display unit, and includes a first transmission area 31 and a second transmission area 32 that respectively allow the displays of the first information area and the second information area to be transmitted therethrough, and these areas are demarcated by the shielding layer 2.

An occupant such as the driver can view the information in the first information area through the first transmission area 31 of the cover glass, and can view the information in the second information area through the second transmission area 32. The shielding layer 2 includes a peripheral edge portion 21 stacked on a peripheral edge portion of the glass sheet 1, and a partition portion 22 that extends in the up-down direction in the vicinity of the center of the glass sheet 1 in the left-right direction and separates the first and second transmission areas 31 and 32 aligned in the horizontal direction. Both the first and second transmission areas 31 and 32 are formed in a rectangular shape extending in the horizontal direction, and are formed in substantially the same size. Hereinafter, the glass sheet 1 and the shielding layer 2 will be described in detail.

<2. Glass Sheet>

<2-1. Shape of Glass Sheet>

In the following, for the sake of convenience of description, the surface of the glass sheet 1 that faces the display unit side will be referred to as a first surface 101, and the surface thereof that faces opposite to the first surface 101, i.e., the surface facing the vehicle interior side, will be referred to as a second surface 102. As shown in FIGS. 1 and 2, the glass sheet 1 is formed in a rectangular shape extending in the horizontal direction, and includes a first area 11, an intermediate area 12, and a second area 13 that are arranged from the right side to the left side in FIG. 2. Each of the three areas 11 to 13 is curved about an axis extending in the up-down direction. The first area 11 is an area including the first transmission area 31, and is curved so as to protrude to the display unit side. The second area 13 is an area including the second transmission area 32, and is curved so as to protrude to the vehicle interior side (the driver side). Also, the intermediate area 12 is an area including the partition portion 22 of the shielding layer 2, and is smoothly curved so as to couple the first area 11 and the second area 13 to each other.

Due to such a shape, the first area 11 is disposed on the rear side (the driver side) in the front-rear direction of the automobile, and the second area 13 is disposed on the front side (the side distant from the driver). Although the degrees of curving of the first to third areas 11 to 13 are not particularly limited, the radius of curvature of the intermediate area 12 can be smaller than those of the first and second areas 11 and 13, for example. Alternatively, each of the radius of curvatures of the first area 11 and the second area 13 can be larger than the other, and can be set as appropriate according to the shape of the dashboard, and the shape and the size of the first and second information areas.

The thickness of the glass sheet 1 is, for example, preferably 0.5 to 3 mm, more preferably 0.7 to 2.5 mm, and even more preferably 1 to 2 mm.

<2-2. Composition of Glass Sheet>

Next, the composition of the glass sheet 1 will be described. In the following, all the percentages representing the components of the glass sheet 1 mean mol %, unless otherwise indicated. As used herein, "consisting essentially" of listed components means that the total contents of the components constitute 99.5 mass % or more, more preferably 99.9 mass % or more, and more preferably 99.95 mass % or more. "Substantially free" of a component means that the content of that component is 0.1 mass % or less, and more preferably 0.05 mass % or less.

Based on the composition (hereinafter may be referred to as "narrowly-defined SL", or simply as "SL") of float sheet glass that is widely used as a glass composition suitable for producing glass sheets with the float process, the present inventors have conducted a study regarding a composition with properties such as $T_2$ and $T_4$ made as close as possible to those of the narrowly-defined SL and with chemical strengthening properties better than those of the narrowly-defined SL by using a composition range that is regarded by those skilled in the art as that of soda-lime silicate glass (hereinafter may be referred to as "broadly-defined SL") suitable for the float process: The composition range is specifically a range in mass % as shown below.

65 to 80% $SiO_2$
0 to 5% $Al_2O_3$
0 to 20% MgO
0 to 20% CaO
10 to 20% $Na_2O$
0 to 5% $K_2O$

The composition may also be as follows.
That is, the composition may contain, in mol %:
66 to 72% $SiO_2$;
2 to 4% $Al_2O_3$;
8 to 15% MgO;
1 to 8% CaO;
12 to 16% $Na_2O$; and
0 to 1% $K_2O$,
a total content of MgO and CaO (MgO+CaO) is in a range of 12 to 17%, and a molar ratio of CaO to the total content of MgO and CaO (CaO/(MgO+CaO)) is in a range of 0.1 to 0.4.

Hereinafter, the components of the glass composition of the glass sheet 1 will be described.

($SiO_2$)

$SiO_2$ is the main component of the glass sheet 1, and an excessively low content of $SiO_2$ reduces the chemical durability, such as water resistance and heat resistance, of the glass. On the other hand, an excessively high content of $SiO_2$ increases the viscosity of the glass sheet 1 at high temperatures, thus making it difficult to melt and form the glass sheet 1. Therefore, the appropriate content of $SiO_2$ is in the range of 66 to 72 mol %, and preferably 67 to 70 mol %.

($Al_2O_3$)

$Al_2O_3$ is a component for improving the chemical durability such as water resistance of the glass sheet 1 and also facilitating migration of alkali metal ions in the glass, thereby increasing the surface compressive stress achieved after chemical strengthening and also increasing the stress layer depth. On the other hand, an excessively high content of $Al_2O_3$ increases the viscosity of the glass melt and hence $T_2$ and $T_4$, and degrades the fining of the glass melt, thus making it difficult to produce a high-quality glass sheet.

Therefore, the appropriate content of $Al_2O_3$ is in the range of 1 to 4 mol %. The content of $Al_2O_3$ is preferably 3 mol % or less and 2 mol % or more.

(MgO)

MgO is an essential component for increasing the meltability of glass. From the viewpoint of sufficiently achieving this effect, the content of MgO in the glass sheet 1 is 8 mol % or more. A MgO content below 8 mol % tends to reduce the surface compressive stress achieved after chemical strengthening, and reduce the stress layer depth. On the other hand, increasing the MgO content beyond an appropriate amount reduces the strengthening effect achieved by chemical strengthening, and particularly leads to drastic reduction in the depth of the surface compressive stress layer. Although MgO contributes the least to this adverse effect among alkaline-earth metal oxides, the content of MgO in the glass sheet 1 is 15 mol % or less. A high MgO content increases $T_2$ and $T_4$ and degrades the fining of the glass melt, thus making it difficult to produce a high-quality glass sheet.

Therefore, the content of MgO in the glass sheet 1 is in the range of 8 to 15 mol %, and preferably 12 mol % or less.

(CaO)

CaO has the effect of reducing the viscosity at high temperatures; however, an excessively high CaO content beyond an appropriate range makes the glass sheet 1 more susceptible to devitrification and also leads to inhibition of migration of sodium ions in the glass sheet 1. If the glass sheet 1 is free of CaO, the surface compressive stress achieved after chemical strengthening tends to be low. On the other hand, if the glass sheet 1 contains more than 8 mol % CaO, the surface compressive stress achieved after chemical strengthening is markedly reduced, and the compressive stress layer depth is significantly reduced, in addition to which the glass sheet 1 is made more susceptible to devitrification.

Therefore, the appropriate content of CaO is in the range of 1 to 8 mol %. The content of CaO is preferably 7 mol % or less and 3 mol % or more.

(SrO, BaO)

SrO and BaO significantly reduce the viscosity of the glass sheet 1, and are more effective than CaO in reducing the liquidus temperature $T_L$ if their content is low. However, even when added in very small amounts, SrO and BaO significantly inhibit migration of sodium ions in the glass sheet 1, thus significantly reducing the surface compressive stress and considerably reducing the depth of the compressive stress layer.

Therefore, it is preferable that the glass sheet 1 is substantially free of SrO and BaO.

(RO)

In the present embodiment, "RO" refers to the total of MgO and CaO. An excessively low RO content leads to insufficiency of components for reducing the viscosity of the glass sheet 1, thus making it difficult to melt the glass sheet 1. On the other hand, an excessively high RO content significantly reduces the surface compressive stress, also considerably reduces the depth of the compressive stress layer, and tends to drastically increase the liquidus temperature $T_L$.

Therefore, the appropriate content of RO is in the range of 12 to 17 mol %. The content of RO is preferably 14 mol % or more and 16 mol % or less.

If the molar ratio CaO/RO of the content of CaO to the content of RO is in the range of 0.1 to 0.4, the liquidus temperature particularly tends to be low. Therefore, the appropriate value of this molar ratio is 0.1 to 0.4. Lowering this molar ratio can increase the surface compressive stress and the depth of the compressive stress layer, but increases $T_2$ and $T_4$ to values far from those of the narrowly-defined SL, thus making is difficult to produce a glass article. Therefore, the molar ratio is preferably 0.2 or more and 0.3 or less.

($Na_2O$)

$Na_2O$ is a component for increasing the surface compressive stress and the depth of the surface compressive stress layer through replacement of sodium ions by potassium ions. However, increasing the $Na_2O$ content beyond an appropriate amount leads to a situation where the magnitude of a surface compressive stress produced by ion exchange in chemical strengthening treatment is surpassed by the magnitude of stress relaxation during the chemical strengthening treatment, as a result of which the surface compressive stress tends to be reduced.

Although $Na_2O$ is a component for increasing the meltability and reducing $T_4$ and $T_2$, an excessively high $Na_2O$ content significantly reduces the water resistance of the glass. When the $Na_2O$ content in the glass sheet 1 is 12 mol % or more, a sufficient effect in reducing $T_4$ and $T_2$ can be achieved. If the content exceeds 16 mol %, there occurs a significant reduction in surface compressive stress due to stress relaxation.

Therefore, the appropriate content of $Na_2O$ in the glass sheet 1 of the present embodiment is in the range of 12 to 16 mol %. The content of $Na_2O$ is preferably 13 mol % or more and 15 mol % or less.

($K_2O$)

Similarly to $Na_2O$, $K_2O$ is a component that increases the meltability of glass. A $K_2O$ content in a low range increases the rate of ion exchange in chemical strengthening, thus increasing the depth of the surface compressive stress layer, but at the same time, reducing the liquidus temperature $T_L$ of the glass sheet 1. Therefore, it is preferable that $K_2O$ is contained at a low content.

$K_2O$ has a lower effect in reducing $T_4$ and $T_2$ than $Na_2O$, but the presence of a large amount of $K_2O$ impedes fining of the glass melt. In addition, the higher the content of $K_2O$ is, the more the surface compressive stress achieved after chemical strengthening is reduced. Therefore, the appropriate content of $K_2O$ is in the range of 0 to 1 mol %.

($Li_2O$)

$Li_2O$ significantly reduces the depth of the compressive stress layer even if its content is low. In addition, when a glass article containing $Li_2O$ is subjected to chemical strengthening with a molten salt of potassium nitrate alone, the rate of degradation of the molten salt is significantly higher than when a glass article free of $Li_2O$ is subjected to the treatment. Specifically, when the chemical strengthening treatment is repeatedly performed using the same molten salt, the surface compressive stress produced in the glass surface is reduced with fewer repetitions of the treatment. Therefore, although the glass sheet 1 of the present embodiment may contain 1 mol % or less $Li_2O$, it is preferable that the glass sheet 1 is substantially free of $Li_2O$.

($B_2O_3$)

$B_2O_3$ is a component that reduces the viscosity of the glass sheet 1 and improves the meltability thereof. However, an excessively high $B_2O_3$ content makes the glass sheet 1 more susceptible to phase separation and reduces the water resistance of the glass sheet 1. In addition, a compound formed from $B_2O_3$ and an alkali metal oxide may be vaporized and damage the refractory material of the glass melting chamber. Furthermore, the presence of $B_2O_3$ causes a reduction in the depth of the compressive stress layer by chemical strengthening. Therefore, the appropriate content of $B_2O_3$ is 0.5 mol % or less. In the present invention, it is more preferable that the glass sheet 1 is substantially free of $B_2O_3$.

($Fe_2O_3$)

Usually, Fe is present in the form of $Fe^{2+}$ or $Fe^{3+}$ in glass, and acts as a coloring agent. $Fe^{3+}$ is a component that enhances the ultraviolet absorbing properties of glass, and $Fe^{2+}$ is a component that enhances the heat absorbing properties of glass. When the glass sheet 1 is used as a cover glass of a display, it is preferable to minimize the Fe content since conspicuous coloring needs to be avoided. However, it is often the case that Fe derived from an industrial raw material is inevitably mixed in the glass sheet 1. Therefore, the iron oxide content as calculated in terms of $Fe_2O_3$ is preferably 0.15 mass % or less, more preferably 0.1 mass % or less, and even more preferably 0.02 mass % or less, based on the total mass of the glass sheet 1 taken as 100 mass %.

($TiO_2$)

$TiO_2$ is a component that reduces the viscosity of the glass sheet 1 and at the same time increases the surface compressive stress produced by chemical strengthening; however, $TiO_2$ may color the glass sheet 1 yellow. Therefore, the appropriate content of $TiO_2$ is 0 to 0.2 mass %. In some cases, $TiO_2$ derived from a commonly used industrial raw material is inevitably mixed in the glass sheet 1 and contained in an amount of about 0.05 mass %. The glass sheet 1 of the present embodiment may contain such a level of $TiO_2$ content because it will not cause coloring of the glass.

($ZrO_2$)

It is known that, when a glass sheet is produced with the float process, $ZrO_2$ derived from refractory bricks forming the glass melting furnace may be mixed in the glass sheet 1 and contained in an amount of about 0.01 mass %. On the other hand, $ZrO_2$ is a component that improves the water resistance of glass and increases the surface compressive stress produced by chemical strengthening. However, a high $ZrO_2$ content may induce an increase in the working temperature $T_4$ or a drastic increase in the liquidus temperature $T_L$. In addition, if the content of $ZrO_2$ is high when a glass sheet is produced with the float process, a precipitated crystal containing Zr is likely to remain as a foreign substance in the glass. Therefore, the appropriate content of $ZrO_2$ is 0 to 0.1 mass %.

($SO_3$)

In the float process, a sulfate such as sodium sulfate ($Na_2SO_4$) is generally used as a fining agent. A sulfate is decomposed in the molten glass to produce a gas component, which promotes degassing the glass melt; however, a portion of the gas component is dissolved and remains in the form of $SO_3$ in the glass sheet 1. In the glass sheet 1 of the present invention, the content of $SO_3$ is preferably 0 to 0.3 mass %.

($CeO_2$)

$CeO_2$ is used as a fining agent. Since $O_2$ gas is produced due to the presence of $CeO_2$ in the molten glass, $CeO_2$ contributes to degassing. On the other hand, too much $CeO_2$ colors the glass yellow. Therefore, the content of $CeO_2$ is preferably 0 to 0.5 mass %, more preferably 0 to 0.3 mass %, and even more preferably 0 to 0.1 mass %.

($SnO_2$)

For a glass sheet formed with the float process, it is known that tin diffused from the tin bath is present in the form of $SnO_2$ in the surface of the glass sheet that has come into contact with the tin bath during the formation. In addition, $SnO_2$ mixed in the raw glass material contributes to degassing. In the glass sheet 1 of the present invention, the content of $SnO_2$ is preferably 0 to 0.3 mass %.

(Other Components)

Preferably, the glass sheet 1 according to the present embodiment consists essentially of the components listed above. However, the glass sheet 1 according to the present embodiment may contain components other than the components listed above within such a range that the content of each of the components is preferably less than 0.1 mass %.

Examples of the other components that may be contained include $As_2O_5$, $Sb_2O_5$, Cl, and F that can be added for the purpose of degassing the molten glass in addition to $SO_3$ and $SnO_2$ described above. However, it is preferable that $As_2O_5$, $Sb_2O_5$, Cl, and F are not added for reasons such as their significant adverse effect on the environment. Additional examples of the other components that may be contained include ZnO, $P_2O_5$, $GeO_2$, $Ga_2O_3$, $Y_2O_3$, and $La_2O_3$. Components other than those described above that are derived from an industrially used raw material may be contained unless their contents exceed 0.1 mass %. These components are optionally added as needed or inevitably contained, and therefore the glass sheet 1 of the present embodiment may be one that is substantially free of these components.

(Density (Specific Gravity):d)

With the use of the above-described composition, according to the present embodiment, it is possible to reduce the density of the glass sheet 1 to 2.53 $g \cdot cm^{-3}$ or less, even more to 2.51 $g \cdot cm^{-3}$ or less, or, in some cases, 2.50 $g \cdot cm^{-3}$ or less.

With the float process or the like, the type of glass to be produced is changed from one to another, if there is a large difference in density between the two types of glass, molten glass of the one type having a higher density may reside at the bottom of the melting furnace, thus hindering the changing of the glass type. The density of soda lime glass, which is currently mass-produced with the float process, is about 2.50 $g \cdot cm^{-3}$. Therefore, for the mass production with the float process, it is preferable that the glass sheet 1 has a density close to the value described above. Specifically, the density of the glass sheet 1 is preferably 2.45 to 2.55 $g \cdot cm^{-3}$, particularly preferably 2.47 to 2.53 $g \cdot cm^{-3}$, and even more preferably 2.47 to 2.50 $g \cdot cm^{-3}$.

(Elastic Modulus: E)

When a glass substrate is subjected to chemical strengthening involving ion exchange, the glass substrate may be warped. In order to reduce the warpage, the glass sheet 1 preferably has a high elastic modulus. According to the present invention, it is possible to increase the elastic modulus (Young's modulus: E) of the glass sheet 1 to 70 GPa or more, or even to 72 GPa or more.

The chemical strengthening of the glass sheet 1 will now be described.

(Conditions for Chemical Strengthening and Compressive Stress Layer)

Chemical strengthening of the glass sheet 1 of the present invention can be achieved by ion exchange treatment in which the glass sheet 1 containing sodium is brought into contact with a molten salt containing monovalent cations, preferably potassium ions, having an ionic radius larger than that of sodium ions so that the sodium ions in the glass sheet 1 are replaced by the monovalent cations. By doing so, a compressive stress layer with a compressive stress is formed on the glass surface.

A typical example of the molten salt is potassium nitrate. A molten salt mixture of potassium nitrate and sodium nitrate can also be used; however, it is preferable to use a molten salt of potassium nitrate alone because the concentration of the molten salt mixture is difficult to control.

The surface compressive stress and the compressive stress layer depth of a strengthened glass article can be controlled not only by the glass composition of the article but also by the temperature of the molten salt during the ion exchange treatment and the length of time of the ion exchange treatment.

It is possible to obtain a strengthened glass article having a very high surface compressive stress and a very large compressive stress layer depth by bringing the glass sheet 1 of the present invention into contact with a molten salt of potassium nitrate. Specifically, it is possible to obtain a strengthened glass article having a compressive stress layer with a surface compressive stress of 700 MPa or more and a depth of 20 μm or more. It is even possible to obtain a strengthened glass article having a compressive stress layer depth of 20 μm or more and a surface compressive stress of 750 MPa or more.

<2-3. Surface Properties of Glass Sheet>

In the glass sheet according to the present embodiment, fine projections and depressions are formed on the second surface facing the vehicle interior side. Specifically, projections and depressions having a depth of 20 to 200 nm are formed. As used herein, "projections and depressions" mean that the distance in the thickness direction of the glass sheet 4 between a maximum projection (the highest projection in the thickness direction of the glass sheet 1) and a maximum recess (the deepest recess in the thickness direction of the glass sheet 4) is in the range of 20 to 200 nm. The same applies to the case where the depth of the projections and depressions is described in the following.

Such projections and depressions can be formed by subjecting the glass sheet 1 to alkali dealkalization treatment described below. Also, the provision of such projections and depressions allows the glass sheet 1 according to the present embodiment to achieve a high transmittance. That is, in a production method described below, the surface of the glass sheet 1 is subjected to dealkalization treatment using a predetermined acid gas, thereby forming a dealkalized layer having projections and depressions. The average value of transmittance gains for 400 to 800 nm wavelength visible light of the glass sheet obtained by this treatment can be 1.0% or more, or even 1.5% or more. Here, the transmittance gains for 400 to 800 nm wavelength light as mentioned herein are each a value obtained by subtracting a measured value of the transmittance of the glass sheet before dealkalization treatment from a measured value of the transmittance of the glass sheet after dealkalization treatment. In general, the transmittance gain is calculated for every 1 nm wavelength interval. The average value of transmittance gains is a value obtained by determining the values of transmittance gains at the corresponding wavelengths in the wavelength range (the wavelength range of 400 to 800 nm in the present embodiment) for which the average value is to be calculated, and then performing simple averaging of the determined values.

Even in the case of a surface formed only by projections and depressions, if the projections and depressions have a depth of 20 to 200 nm, this is smaller than the wavelength band of visible light. In the case where the projections and depressions are formed in such a depth, a state in which the air and the glass are mixed is brought about, and the apparent refractive index is reduced. As a result, the transmittance is improved. In addition, voids may be formed on the projections of the surface and/or inside of the projections. The voids may be formed over the entire surface on which the projections and depressions are formed, or may be formed in a portion thereof. Accordingly, the apparent refractive index is further reduced, which consequently contributes to an improvement in the transmittance.

Note that a surface layer in which the projections and depressions are formed, and a bulk layer in contact with the surface layer are formed as a single piece. That is, the surface layer and the bulk layer are formed from substantially the same composition. On the other hand, for a known glass sheet whose surface layer is formed by a film, the boundary of the layer may be confirmed. In addition, when the film is baked at a low temperature, an alkoxide group may remain in the film without being hydrolyzed.

In this respect, as described above, the cover glass according to the present invention includes a surface layer and a bulk layer that are formed as a single piece, and therefore has an adhesive strength of 100 mN or more, as measured according to JIS R 3255 "Test methods for adhesion of thin films on glass substrate", for example.

Such projections and depressions can be provided in various forms. For example, it is possible to provide a difference in the depth of the projections and depressions between the first surface 101 and the second surface 102 of the glass sheet 1. For example, projections and depressions may be formed on only one surface, and the depth of projections and depressions on the other surface may be substantially 0.

Alternatively, the depth of the projections and depressions of the first transmission area 31 may be smaller than that of the second transmission area 32 on at least one of the first surface 101 and the second surface 102. By doing so, the transmittance of the second transmission area 32 is increased to be larger than the transmittance of the first transmission area 31. The first transmission area 31, which is located in front of the driver, is disposed at a position closer to the driver, whereas the second transmission area 32, which is located on the center console side, is disposed in an oblique direction as seen from the driver, at a position distant from the driver. Therefore, increasing the transmittance of the second transmission area 32 makes the second transmission area 32 more visible from the driver.

Alternatively, the depth of the projections and depressions may be varied in the first transmission area 31 and the second transmission area 32. For example, the depth of the projections and depressions may be changed between the vicinity of an edge and the vicinity of the center of each of the transmission areas 31 and 32. Alternatively, the depth of the projections and depressions may be gradually changed from the vicinity of the edge to the vicinity of the center. The reason is that the visibility from the driver differs between the vicinity of the edge and the vicinity of the center because the glass sheet 1 is curved in the present embodiment. For example, the vicinity of the edge can be made more visible by making the projections and depressions in the vicinity of the edge deeper. Accordingly, in each of the transmission areas 31 and 32, it is possible to gradually change antiglare properties, abrasion resistance, and fingerprint resistance, which will be described later, in addition to the transmittance.

The projections and depressions as described above can be formed by various methods, and may be formed by, for example, the following method. An example of the glass sheet production method for forming the projections and depressions as described above will now be described.

The production method includes the following steps of:

(I) forming a molten raw glass material into a glass ribbon on a molten metal; and (II) bringing an acid gas that contains a fluorine element (F)-containing acid and in which a volume ratio of water vapor to the acid (Volume of the water vapor/Volume of the acid) is 0 or more and 30 or less, into contact with a surface of the glass ribbon on the molten metal so as to subject the surface of the glass ribbon to dealkalization treatment and control a morphology of the surface in accordance with the volume ratio.

Figure 3:
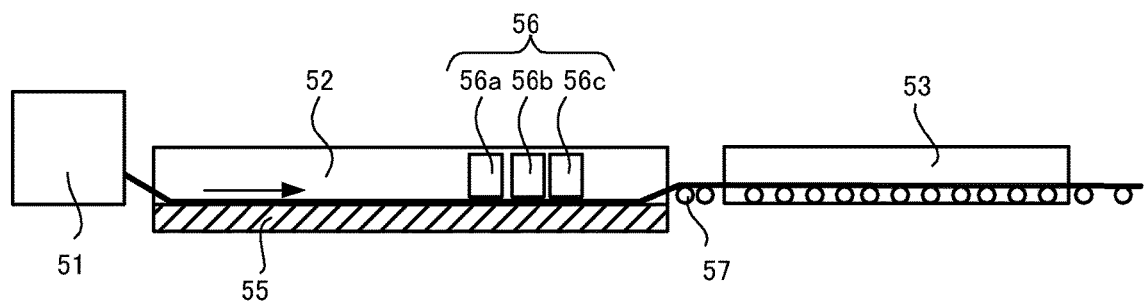
FIG. 3 is a diagram showing an example of a production method of a glass sheet.

This method can be performed, for example, using an apparatus shown in FIG. 3. First, a raw glass material melted (molten glass) in a float furnace 51 flows from the float furnace 51 into a float bath 52, is formed into a semisolid glass ribbon 10 while traveling on molten tin (molten metal) 55, and is then drawn out of the float bath by a roller 57 to be fed into an annealing furnace 53. The glass ribbon solidified in the annealing furnace 53 is cut into glass sheets having a predetermined size by a cutting device which is not shown.

A predetermined number of coaters 56 (three coaters 56a, 56b, and 56c in the apparatus shown) are disposed in the float bath 52 at a predetermined distance from a surface of the high-temperature glass ribbon 10 on the molten tin 55. An acid gas for dealkalization treatment is continuously supplied onto the glass ribbon 10 from at least one of the coaters 56a to 56c. Thus, a dealkalized layer from which an alkali component has been sufficiently removed is formed on the surface of the glass ribbon 10. Since the temperature of the glass ribbon 10 on the molten tin 55 is much higher than the glass-transition point, modification of the glass surface is effectively achieved. The acid gas used contains a fluorine element (F)-containing acid (desirably hydrogen fluoride). The acid gas may or may not contain water vapor. The surface morphology of the resulting glass sheet can be changed depending on the presence or absence of water vapor in the acid gas and on the amount of water vapor contained in the acid gas (the volume ratio of water vapor to the acid).

The present inventors make the following consideration on the reason why the surface morphology can be changed as described above. In the case where the acid gas is, for example, acidic water vapor containing hydrogen fluoride and water vapor, bringing such acidic water vapor into contact with a surface of the hot glass ribbon 10 causes elution of alkali ions in the glass surface, leading to formation of a dealkalized layer in the surface of the glass ribbon 10. In addition, the acidic water vapor enters the glass in various forms, such as in the form of proton ($H^+$), water ($H_2O$), and oxonium ion ($H_3O^+$), after which the water having entered the glass exits from the glass by dehydration condensation. Furthermore, since hydrogen fluoride breaks Si—O bonds that are basic structures of the glass, it is easy for water and oxonium ions to enter the glass, in addition to which phenomena such as erosion of glass by hydrogen fluoride and reprecipitation of glass occur in a complicated manner. For these and other reasons, changing the amount of water vapor in the acidic water vapor, which causes a change in the degree of progression of dehydration condensation, makes it possible for the surface of the dealkalized layer, i.e., the surface of the glass ribbon 10, to have a projection-depression pattern or a flat, smooth, and dense structure. In the present specification, the dense structure means a structure that has an increased number of siloxane bonds produced by dehydration condensation as described above.

As described above, the surface morphology of the resulting glass sheet 1 varies depending on the amount of water vapor contained in the acid gas. Four surface morphologies will be described below.

(First Surface Morphology)

For example, when no water vapor is present in the acid gas, that is, when the volume ratio of water vapor to the acid is 0, projections and depressions having a depth of 20 to 100 nm can be formed on the surface of the dealkalized layer. Presumably, although no water vapor is contained in the acid gas to be brought into contact with the surface of the glass sheet, water present in the glass or water generated by erosion of the surface of the glass sheet by hydrogen fluoride causes slight dehydration condensation to proceed, resulting in the formation of such projections and depressions.

(Second Surface Morphology)

When the amount of water vapor contained in the acid gas is adjusted within such a range that the volume ratio of the water vapor to the acid in the acid gas is more than 0 and not more than 1.5, projections and depressions having a depth of 100 to 200 nm can be formed on the surface of the dealkalized layer such that an average value of porosities in an area in the thickness direction where the projections and depressions are formed is 30 to 50%. Presumably, since the amount of water vapor in the acid gas is relatively small, the progression of dehydration condensation is reduced, resulting in the formation of such projections and depressions. Here, the porosities mean the proportions of spaces at different levels in the thickness direction in a cross-section of the glass sheet taken along the thickness direction. Specifically, the porosities can be determined as follows. First, an image of a cross-section of the glass sheet in the thickness direction is scanned by a scanner, and the scanned image data is subjected to binarization. Then, the number of black pixels, i.e., pixels representing voids, in the binarized image data is counted. In this manner, the porosities can be calculated. The average value of porosities is a value obtained by dividing, by the projection-depression thickness, a value obtained by integrating the porosities over the surface area in the thickness direction of the glass sheet where the projections and depressions are formed. An example of the second surface morphology is a pattern in which repeating projections and depressions are formed on the surface of the glass sheet, the distance between a projection reference level and a depression reference level in the thickness direction of the glass sheet is 100 to 200 nm, and the change rate of the porosity in an area between the projection reference level and the depression reference level is −3.0 to 2.0%/nm over the area from the projection reference level to the depression reference level.

The projection reference level is a level in the thickness direction at which the porosity is 80%, and the depression reference level is a level in the thickness direction at which the porosity is 20%. The depressions are depressed in the thickness direction of the glass sheet, and projections are raised in the thickness direction of the glass sheet. The projection reference level can be regarded as a reference level from which the depressions are depressed, while the depression reference level can be regarded as a reference level from which the projections are raised. In the case of the second surface morphology, the surface of the glass sheet is denser than in the case of the first surface morphology. Presumably, this is achieved as a result of the dehydration condensation being promoted due to water vapor contained in the acid gas supplied for formation of the second surface morphology.

Due to the above characteristic structure of the second surface morphology of the dealkalized layer, the glass sheet having the second surface morphology can achieve a very high transmittance. That is, in the production method of the present embodiment, the average value of transmittance gains for 400 to 800 nm wavelength visible light can be increased to 2.5% or more, or even 3.0% or more in the resulting glass sheet by selecting an acid gas that allows the projections and depressions of the second surface morphology to be formed on the surface of the dealkalized layer.

(Third Surface Morphology)

When the amount of water vapor contained in the acid gas is adjusted within such a range that the volume ratio of the water vapor to the acid is more than 1.5 and less than 8, projections and depressions having a depth of 20 to 100 nm can be formed on the surface of the dealkalized layer. Presumably, since the amount of water vapor in the acid gas is moderate, the above-mentioned dehydration condensation proceeds to a moderate degree, resulting in the formation of such projections and depressions. In the case of the third surface morphology, the surface of the glass sheet is denser than in the cases of the first surface morphology and the second surface morphology. Presumably, this is achieved as a result of the dehydration condensation being further promoted due to the larger amount of the water vapor contained in the acid gas.

Due to the above characteristic structure of the third surface morphology of the dealkalized layer, the glass sheet having the third surface morphology can achieve an increased transmittance. That is, in the production method of the present embodiment, the average value of transmittance gains for 400 to 800 nm wavelength visible light can be increased to 0.5% or more, or even 1.0% or more in the resulting glass sheet by selecting an acid gas that allows the projections and depressions of the third surface morphology to be formed on the surface of the dealkalized layer. Additionally, the mechanical strength properties, in particular, abrasion resistance and weather resistance, can be improved compared to those of the glass sheets having the first surface morphology and the second surface morphology described above. This is because the further densification of the surface of the glass sheet increases the abrasion resistance of the surface and reduces elution of an alkali component in the glass sheet. Specifically, the amount of eluted sodium ions in the glass sheet as measured after the glass sheet is left in pure water kept at 95° C. for 24 hours can be reduced to 0.3 to 0.4 μg per unit surface area of the glass sheet.

(Fourth Surface Morphology)

In the case of using an acid gas containing a large amount of water vapor, such as an acid gas in which the volume ratio of the water vapor to the acid is 8 or more and 30 or less, a flat and smooth dealkalized layer can be formed, and a flat, smooth, and dense structure can be obtained in which the average value of porosities is 0 to 10% in an area of 20 to 100 nm thickness where the dealkalized layer is formed. Presumably, such a structure is obtained as a result of the progression of the above-described dehydration condensation being promoted sufficiently due to the amount of the water vapor that is sufficient with respect to the amount of the acid gas.

Due to the above characteristic structure of the fourth surface morphology of the dealkalized layer, the glass sheet having the fourth surface morphology can achieve an increased transmittance. That is, in the production method of the present embodiment, the average value of transmittance gains for 400 to 800 nm wavelength visible light can be increased to 0.1% or more in the resulting glass sheet by selecting an acid gas that allows the dense structure of the fourth surface morphology to be formed in the surface of the dealkalized layer. Additionally, the mechanical strength properties, in particular, abrasion resistance and weather resistance, can be further improved compared to those of the glass sheets having the first to third surface morphologies described above. This is because the formation of the dense structure in the surface of the glass sheet further increases the abrasion resistance of the surface and further reduces elution of an alkali component in the glass sheet. Specifically, the amount of eluted sodium ions in the glass sheet as measured after the glass sheet is left in pure water kept at 95° C. for 24 hours can be reduced to 0.2 μg or less per unit surface area of the glass sheet.

<3. Shielding Layer>

The shielding layer 2 will now be described. The shielding layer 2 is made from ceramic of a dark color such as black, and is stacked on the first surface 101 of the glass sheet 1.

The ceramic that forms the shielding layer 7 may have the following composition, for example.

TABLE 1

|  |  | First and second colored ceramic pastes |
|---|---|---|
| Pigment *1 | Mass % | 10 |
| Resin (cellulose resin) | Mass % | 10 |
| Organic solvent (pine oil) | Mass % | 10 |
| Glass binder *2 | Mass % | 70 |
| Viscosity | $dP_s$ | 150 |

*1, Main components: copper oxide, chromium oxide, iron oxide, and manganese oxide
*2, Main components: bismuth borosilicate, zinc borosilicate Although the ceramic can be formed using a screen-printing process, it can also be produced, instead of the screen-printing process, by transferring a transfer film for firing to the outer glass sheet 1 and firing the film. In the case of using screen printing, the screen printing can be performed, for example, under the conditions that a polyester screen of 355 mesh is used, the coating thickness is 20 μm, the tension is 20 Nm, the squeegee hardness is 80 degrees, the attachment angle is 75°, and the printing speed is 300 mm/s, and the ceramic can be formed by performing drying in a drying furnace at 150° C. for 10 minutes.

The shielding layer 2 can also be made of another material, instead of stacking ceramic. In addition, the shielding layer 2 can also be formed by bonding a resin shielding film of a dark color.

<4. Features>

As described above, according to the present embodiment, the following effects can be achieved.

(1) Since the transmission areas 31 and 32 are separated by the shielding layer 2, displays of the information areas are clearly visible. Accordingly, a plurality of information display areas can be covered by a single glass sheet. In addition, any step or gap formed on wiring and a dashboard can be concealed by the shielding layer 2.

(2) Since fine projections and depressions are formed in the glass sheet 1, the transmittance can be improved as described above. Accordingly, the visibility of each of the information areas can be enhanced. In addition, formation of projections and depressions can improve the low friction properties and the fingerprint resistance (the property of reducing the amount of fingerprints to be left) of the glass sheet 1, thus allowing the cover glass to be also used as a touch panel. In particular, the second transmission area 32 can be used as a display of a navigation system, so that the area 32 can be used as a touch panel area. In addition, the projections and depressions can enhance the antiglare properties.

(3) The glass sheet 1 is curved, the first area 11 is located on the front side of the automobile, and the second area 12 is located on the rear side thereof, and it is thus possible to improve the interior of the automobile. In addition, the second area 12, which is distant from the driver's seat, is disposed on the rear side, i.e., the driver's seat side, and the second transmission area 32 formed in the second area 12 can thus be made more visible to the driver. Furthermore, the intermediate area 12 serving as a step is provided between the first area 11 and the second area 13, which is also effective in the case where the space between the first information area and the second information area is narrow.

<4. Modifications>

Although an embodiment of the present invention has been described above, the present invention is not limited to the above-described embodiment, and various modifications may be made to the invention without departing from the spirit or essential characteristics thereof. Additionally, the following modifications can be combined as appropriate.

<4-1>

The shape of the glass sheet 1 is not particularly limited, and the glass sheet 1 can have various shapes. In the case where the glass sheet 1 has a shape that is long in the horizontal direction as in the case of the above embodiment, the maximum length in the horizontal direction of the glass sheet 1 when installed in an automobile is preferably greater than or equal to three times the maximum length thereof in the vertical direction.

Although a curved glass sheet is described in the above embodiment, the degree of curving, the number, and the position of curves are also not particularly limited, and can be changed as appropriate according to the shape of a dashboard or a center console of an automobile in which the glass sheet is installed. Alternatively, the glass sheet may have a flat shape or a V-shape, rather than a shape having a specific curvature.

Figure 4:
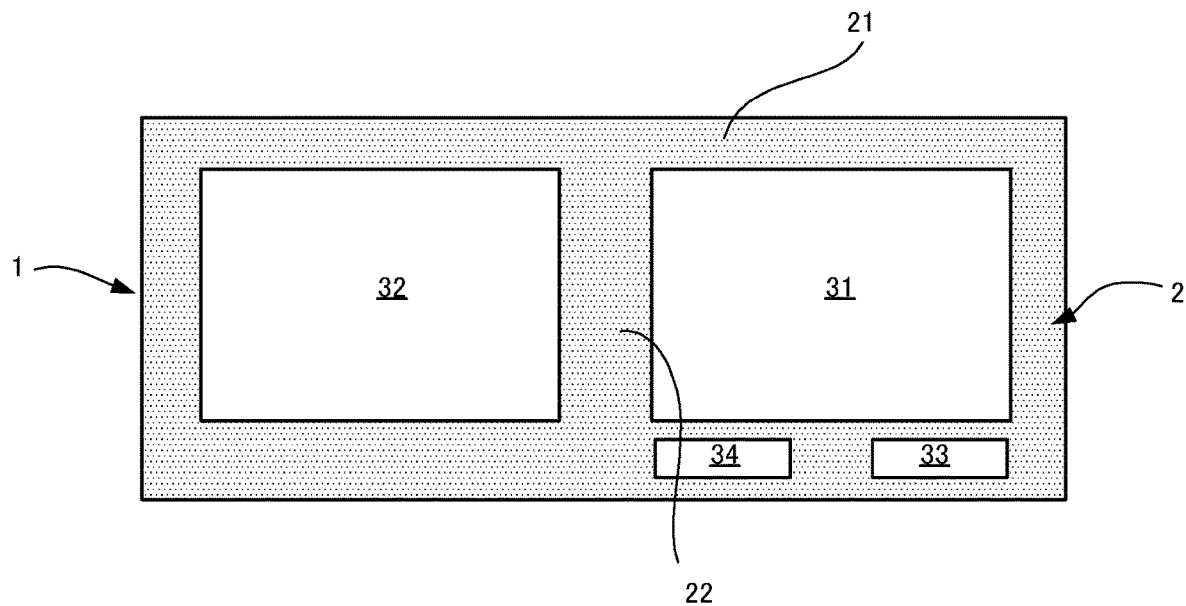
FIG. 4 is a plan view showing another example of the cover glass according to the present invention.

The shape, the position, and the number of transmission areas are also not particularly limited, and the number of transmission areas may be a number other than two, which is shown above. For example, the glass sheet 1 may include four or more transmission areas by further providing two transmission areas 33 and 34 below the first transmission area 31 as shown in FIG. 4.

In the above embodiment, the depth of the projections and depressions of the second transmission area is larger than that of the first transmission area; however, the present invention is not limited thereto, and the depth of the projections and depressions may be changed as appropriate, for example, such that the first and second areas have the same depth of projections and depressions, or that the depth of the projections and depressions of the first transmission area is larger than that of the second area.

The depth of the projections and depressions may be different between the first surface and the second surface of the glass sheet. For example, the depth of the projections and depressions of one of the first surface and the second surface may be substantially 0, and the projections and depressions may be formed on only one surface.

In the above embodiment, the glass sheet 1 is formed of a single glass sheet; however, it is possible to use a laminated glass in which a resin intermediate film is disposed between two glass sheets, instead of using a single glass sheet.

REFERENCE SIGNS LIST

1 Glass sheet
101 First surface
102 Second surface
2 Shielding layer
31 First transmission area
32 Second transmission area

The invention claimed is:

1. A cover glass that can be installed in an automobile so as to cover a display unit including a plurality of information areas, comprising
  a glass body that has a first surface facing the display unit side, and a second surface opposite to the first surface, and that includes a plurality of transmission areas respectively corresponding to the information areas,
  wherein the plurality of transmission areas extends in the horizontal direction, and include a first transmission area located close to a driver's seat side, and a second transmission area located distant from the driver's seat, projections and depressions are formed on a surface of each of the first transmission area and the second transmission area, and a depth of the projections and depressions of the second transmission area is larger than a depth of the projections and depressions of the first transmission area.

2. The cover glass according to claim 1, wherein the cover glass has a maximum length in a horizontal direction that is greater than or equal to three times a maximum length thereof in a vertical direction.

3. The cover glass according to claim 2, wherein the glass body has a length in the horizontal direction of 500 mm or more.

4. The cover glass according to claim 1, further comprising a shielding layer that is stacked between the first transmission area and the second transmission area of the glass body, and that does not transmit light therethrough.

5. The cover glass according to claim 4, wherein the shielding layer is stacked in an area of the glass body that is other than the first and second transmission areas.

6. The cover glass according to claim 1, wherein projections and depressions are formed on at least one of the first surface and the second surface, and the projections and depressions have a depth of 20 to 200 nm.

7. The cover glass according to claim 6, wherein, when the surface on which the projections and depressions are formed is subjected to a scratch test according to JIS R 3255 "Test methods for adhesion of thin films on glass substrate", the cover glass has an adhesive strength of 100 mN or more.

8. The cover glass according to claim 6, wherein the depth of the projections and depressions formed on the first surface and the depth of the projections and depressions formed on the second surface are different from each other.

9. The cover glass according to claim 6, wherein the glass body has an average value of transmittance gains for 400 to 800 nm wavelength light, of 1.0 or more.

10. The cover glass according to claim 6, wherein, in the first surface and the second surface, voids are formed on the surface on which the projections and depressions are formed, and/or inside the projections and depressions.

11. The cover glass according to claim 1, wherein projections and depressions are formed in a surface of each of the first transmission area and the second transmission area, and a depth of the projections and depressions in the vicinity of a peripheral edge of each of the first transmission area and the second transmission area is different from a depth of the projections and depressions in the vicinity of a center of each of the first transmission area and the second transmission area.

12. The cover glass according to claim 1, wherein, in the glass body, an area in which the first transmission area is formed, and an area thereof in which the second transmission area is formed are different from each other in positions in a front-rear direction of the automobile.

13. The cover glass according to claim 1, wherein the glass body includes a first area in which the first transmission area is formed, a second area in which the second transmission area is formed, and an intermediate area between the first area and the second area, and a radius of curvature of the intermediate area is smaller than a radius of curvature of each of the first and second areas.

14. The cover glass according to claim 1, wherein the glass body is formed flat.

15. The cover glass according to claim 1, wherein the glass body contains, in mol %:

66 to 72% $SiO_2$;
2 to 4% $Al_2O_3$;
8 to 15% $MgO$;
1 to 8% $CaO$;
12 to 16% $Na_2O$; and
0 to 1% $K_2O$,
a total content of MgO and CaO (MgO+CaO) is in a range of 12 to 17%, and
a molar ratio of CaO to the total content of MgO and CaO(CaO/(MgO+CaO)) is in a range of 0.1 to 0.4.

16. The cover glass according to claim 1, wherein the glass body has been subjected to chemical strengthening.

17. The cover glass according to claim 1, wherein the glass body includes:

a first glass sheet;
a second glass sheet; and
an intermediate film disposed between the first and second glass sheets.

* * * * *